US010835877B2

(12) United States Patent
Ouriev

(10) Patent No.: US 10,835,877 B2
(45) Date of Patent: Nov. 17, 2020

(54) METHOD FOR PRODUCING DISPERSIONS OF A DEFINED PARTICLE SIZE

(71) Applicant: ARCOLOR AG, Waldstatt (CH)

(72) Inventor: Boris Ouriev, Gossau (CH)

(73) Assignee: ARCOLOR AG, Waldstatt (CH)

( * ) Notice: Subject to any disclaimer, the term of this patent is extended or adjusted under 35 U.S.C. 154(b) by 239 days.

(21) Appl. No.: 16/084,217

(22) PCT Filed: Mar. 14, 2017

(86) PCT No.: PCT/EP2017/025049
§ 371 (c)(1),
(2) Date: Sep. 11, 2018

(87) PCT Pub. No.: WO2017/157534
PCT Pub. Date: Sep. 21, 2017

(65) Prior Publication Data
US 2019/0076796 A1    Mar. 14, 2019

(30) Foreign Application Priority Data

Mar. 15, 2016    (CH) ......................................... 345/16

(51) Int. Cl.
*B01F 3/12*        (2006.01)
*B01F 3/20*        (2006.01)
(Continued)

(52) U.S. Cl.
CPC .......... *B01F 3/1214* (2013.01); *B01F 3/2071* (2013.01); *B01F 3/2261* (2013.01);
(Continued)

(58) Field of Classification Search
CPC .... B01F 3/1214; B01F 3/2261; B01F 3/2276; B01F 15/0416; B01F 3/2071; B01F 5/102;
(Continued)

(56) References Cited

U.S. PATENT DOCUMENTS 3,416,320 A * 12/1968 Asher ..................... B01F 5/102
                                                60/208
3,580,862 A *  5/1971 Watson et al. ........ B01F 3/0853
                                                516/35
(Continued)

FOREIGN PATENT DOCUMENTS

CA          2227667 A1      7/1999
DE      102006028590 A1    12/2007
(Continued)

*Primary Examiner* — Charles Cooley
(74) *Attorney, Agent, or Firm* — SZDC Law P.C.

(57) ABSTRACT

A method for producing dispersions with a defined particle size includes following steps: A) Preparation of a mixed dispersion in a predispersion process, B) introduction of the mixed dispersion into at least one continuously operating separating device, C) separation of the mixed dispersion in the separating device into coarse particles of a coarse-part dispersion and into fine particles of a fine-part dispersion, D) discharging the fine particle dispersion from the separating device into at least one storage tank, E) discharging the coarse particle dispersion from the separating device into at least one disperser, F) grinding the coarse particles of the coarse particle dispersion in the disperser into a dispersed particle mixture and returning the dispersed particle mixture to the mixing tank in the predispersion process, and G) mixing the dispersed particle mixture returned to the predispersion process with the mixing dispersion produced in the predispersion process in the mixing tank.

9 Claims, 2 Drawing Sheets

(51) Int. Cl.
  *B01F 5/10*   (2006.01)
  *C09B 67/46*  (2006.01)
  *B01F 3/22*   (2006.01)
  *B01F 15/04*  (2006.01)
  *B01F 13/10*  (2006.01)

(52) U.S. Cl.
  CPC ............ *B01F 3/2276* (2013.01); *B01F 5/102* (2013.01); *B01F 15/0416* (2013.01); *C09B 67/0091* (2013.01); *B01F 2003/125* (2013.01); *B01F 2013/1086* (2013.01)

(58) Field of Classification Search
  CPC ....... B01F 2013/1086; B01F 2003/125; C09B 67/0091
  See application file for complete search history.

(56) References Cited

U.S. PATENT DOCUMENTS

| | | | | |
|---|---|---|---|---|
| 7,100,851 | B2 * | 9/2006 | Hiraki | B01F 3/1207 241/101.8 |
| 10,201,789 | B2 * | 2/2019 | Ishida | B01F 13/1027 |
| 2006/0249605 | A1 * | 11/2006 | Hiraki | B01F 5/104 241/21 |
| 2014/0004367 | A1 * | 1/2014 | Sugiyama | C09D 4/00 428/510 |
| 2018/0085718 | A1 * | 3/2018 | Van Der Meer | B01F 3/1271 |
| 2019/0076796 | A1 * | 3/2019 | Ouriev | B01F 3/2276 |

FOREIGN PATENT DOCUMENTS

| | | | | |
|---|---|---|---|---|
| FR | 3001910 | A1 | 8/2014 | |
| GB | 1070851 | A * | 6/1967 | ............. B01J 23/04 |
| WO | 97/36674 | * | 10/1997 | |

* cited by examiner

METHOD FOR PRODUCING DISPERSIONS OF A DEFINED PARTICLE SIZE

CROSS-REFERENCES TO RELATED APPLICATIONS

This application is the national stage application of PCT/EP2017/025049, filed on Mar. 14, 2017, which claims priority Swiss Application No. 345/16, filed on Mar. 15, 2016, which is incorporated by reference for all purposes as if fully set forth herein.

BACKGROUND OF THE INVENTION

The present invention concerns a method for producing dispersions of a defined particle size, wherein a mixed dispersion is continuously separated into a coarse fraction dispersion and a fine fraction dispersion.

In the production of dispersions in which solid particles (disperse phase) are distributed in a liquid dispersion medium (continuous phase), usually a mixture of solid particles with different particle sizes is first created.

For certain applications, however, it is necessary for the disperse phase to contain solid particles with an approximately constant particle size, and for a maximum particle size not to be exceeded. It is decisive for the quality of disperse dyes that the dye pigments of the dispersed phase have a specific particle size. For example, in metal-effect pigments, such as pigments of aluminium, iron, copper and their alloys, the appearance of the pigments and the colour intensity are dependent on the particle size. Coarse particles create a glittering impression, and fine particles create a soft transition on changes of observation angle.

In printing inks and pigment-based inks which flow through channels and printing nozzles in the printing system, the individual dye pigments must never exceed the maximum permitted particle size since otherwise the nozzles of the printing system in particular would become clogged. The particle size also influences the pigment dispersion stability, which is critical during the usage period of the printing inks. The Brownian motion of very small particles helps prevent the pigments from settling, which can also lead to a successive blocking of the channels and nozzles of the printing system.

Because such clogging in the printing system may have very high follow-on costs, manufacturers of pigment-based printing inks must be able to guarantee a specific quality of the disperse phase in relation to particle size.

With disperse dyes, it is characteristic of the production process that a bimodal particle size distribution is created in the disperse phase, i.e. the frequency distribution of particle sizes has two maxima, one maximum for coarse particles and one maximum for fine particles. The bimodal size distribution may be both symmetrical and asymmetrical.

The maximum permitted particle size which may be contained in the fine fraction dispersion to be created, and which is established by the user of dispersion inks or by the customer, should correspond to a threshold value which lies in the minimum between the two maxima of the bimodal size distribution.

Filtration of the dispersion is the safest method for guaranteeing, in production, that no particles of the disperse phase exceed the maximum permitted particle size. To reduce the costs of filtration, the bimodal particle size distribution should be dissipated as far as possible in the dispersion to be filtered, i.e. the bimodal size distribution should be asymmetrical such that the maximum for fine particles is many times greater than the maximum for coarse particles. The aim in production of the fine fraction dispersion is a phase shift towards a monomodal particle size distribution, i.e. the size distribution has only one maximum for fine particles. The number of particles remaining in the filter and hence the cost of filtration are lower, the more pronounced the phase shift in favour of the fraction of fine particles even before the filtration process.

In a conventional production process, the dye pigments of the disperse phase are mixed with solvents of the continuous phase and crushed in the disperser or in the agitator ball mill (see FIG. 1 and description of the figures below). Since crushing the dye pigments of the disperse phase in the agitator ball mill does not generate a uniform particle size of the dye pigments, but a bimodal particle size distribution as described above, to guarantee a specific threshold value of particle sizes, it is necessary to separate the particle size mixture into a coarse fraction and a fine fraction. To achieve a phase shift in the direction of the fine fraction, the process operated in the batch or charge method must be repeated several times. The entire batch is thus passed repeatedly through the agitator ball mill although an increasing fine fraction in the batch is already adequately comminuted and dispersed. This is inefficient in terms of process technology and energy, and means that the entire plant must always be over-dimensioned.

In other production methods, only filter devices are used for separating the particle mixture. Publication DE 33 42 689 A1 discloses a filter device for removing contaminants from liquids, in particular from disperse dyes. The costs of a process for separating dispersions using filters only are increased further if two filter devices must be connected in parallel for a continuous procedure. Also, filters do not function with particularly small particle sizes.

It is more economic to separate the particle mixture of the disperse phase continuously by the effect of centrifugal forces. Publication DE 24 26 908 A1 discloses a centrifugal particle-elutriation device and a method for its use. Elutriation is used to separate particles of the same density and different effective diameters, wherein the fraction of the particles settling more rapidly moves in the centrifugal direction and the particles settling more slowly move in the centripetal direction. The method is based in general on application of Stokes' law, according to which particles of different sizes try to settle against the centrifugal border at different speeds.

SUMMARY OF THE INVENTION

The object of the present invention is to refine the above-mentioned production method (see FIG. 1) in that, to produce the same product quantity of fine fraction dispersion in comparison with known production methods, the plant can be designed so as to be smaller and more efficient, i.e. cheaper to purchase and operate.

The new method for production of dispersions of a defined particle size, wherein a mixed dispersion is continuously separated into a coarse fraction dispersion and a fine fraction dispersion, comprises the following steps:

A) continuously or discontinuously producing the mixed dispersion in a predispersion process, in that a particle mixture of a disperse phase is mixed with a liquid continuous phase to form the mixed dispersion and is temporarily stored in at least one mixing tank, B) introducing the mixed dispersion from the predispersion process into at least one continuously operating separating device, C) separating the particle mixture of the mixed dispersion in the at least one separating device into coarse particles of the coarse fraction dispersion and into fine particles of the fine fraction dispersion according to a threshold value for the particle size, D) discharging the fine fraction dispersion from the at least one separating device into at least one storage tank, E) discharging the coarse fraction dispersion from the at least one separating device into at least one disperser, F) crushing the coarse particles of the coarse fraction dispersion in the at least one disperser into a dispersed particle mixture, and returning the dispersed particle mixture into the at least one mixing tank in the predispersion process, and G) mixing the dispersed particle mixture returned to the predispersion process with the mixed dispersion produced in the predispersion process in the at least one mixing tank.

Since, even after a single performance of method steps A to C, the bimodal particle size distribution of the mixed dispersion has been separated into the coarse fraction dispersion and the fine fraction dispersion, and the fine fraction dispersion is not returned to the circuit of the coarse fraction dispersion, but in step D separated into a storage tank, there is no successive phase shift in the mixed dispersion as described initially. The fine fraction dispersion, the fine particles of which correspond to the threshold value for the particle size, does not pass through steps A to C again, which means that in comparison with the prior art (see FIG. 1), the plant may be designed so as to be smaller and more efficient.

In this way, advantageously, only the coarse fraction dispersion is conducted to the disperser in order for the coarse particles of the coarse fraction dispersion to be crushed and the resulting dispersed particle mixture returned to the predispersion process, so that this can be mixed in the mixing tank with the mixed dispersion which is produced in step A from the disperse phase and the liquid continuous phase.

In this recirculation of the dispersed particle mixture in the predispersion process, the particles of the dispersed particle mixture are mixed with the particles of the particle mixture from the original mixed dispersion produced from the disperse phase and the liquid continuous phase.

A particle mixture, designated with reference sign Pm may therefore also contain particles of the dispersed particle mixture, designated with reference sign PDm. The reference sign PDm is also applied to a liquid dispersion in which the dispersed particle mixture is dissolved.

The method steps are repeated until the mixed dispersion in at least one mixing tank or the fine fraction dispersion in at least one storage tank has exceeded a specific fill level, or if several mixing and storage tanks are used, until the mixed dispersion in all of the respective tanks has exceeded a specific fill level. These fill levels are particularly suitable as regulation parameters for the production process. The process is stopped when the mixing tank or all mixing tanks are filled with mixed dispersion, or when the storage tank or all storage tanks are filled with fine fraction dispersion.

As soon as the mixed dispersion in the mixing tank has fallen below a specific minimum fill level, the method step A for producing the mixed dispersion is intensified on continuous production and repeated more often on discontinuous production. Intensified here means an increase in the introduced quantities of particle mixture of the disperse phase and liquid continuous phase which are mixed in the predispersion process to form the mixed dispersion. On discontinuous production, the output quantity of mixed dispersion may be reached by shorter interruption intervals or by a transition to continuous production. In this way, the fill level of the mixing tank rises further, at most until the highest fill level is exceeded.

In a particularly preferred embodiment of the invention, the mixed dispersion to be separated is a dye dispersion with fractions of coarse and fine dye pigments. The applicant produces mainly dye dispersions using the prior art shown in FIG. 1. The new method was developed for a more efficient production of pigment-based printing inks in terms of process technology and energy, in which a specific particle size of the dye pigments can be guaranteed.

However, the method is also suitable for continuous separation of other mixed dispersions into a coarse fraction and a fine fraction dispersion, such as for example all types of suspensions in chemical process technology and in foodstuff technology.

The method according to the invention is particularly suitable for liquid dispersions with particle mixtures in the disperse phase in which the particle size of the coarse particles lies in the range from 0.5 µm to 1000 µm, and the particle size of the fine particles lies in the range from 0.01 µm to 100 µm. In addition, the method is also suitable for particle sizes to be separated from 0.1 to 1000 µm. Using the disperser, particle sizes of just 0.5 µm can be produced, so that the separating device is also suitable for classifying such small particles or particle sizes.

The particle sizes given here are always the equivalent diameter of the particle, which is a measure of the size of an irregularly formed particle, such as for example a sand grain or a dye pigment. The equivalent diameter is calculated from comparison of a property of the irregular particle with a property of a regularly formed particle.

Preferably, at least one particle filter ensures that the particles of the particle mixture of the mixed dispersion produced in the predispersion process, which exceed a specific maximum particle size, are not introduced into the separating device. At least one such particle filter is advantageously arranged in the course of the supply line to the separating device in order to filter out oversize particles upstream of the separating device.

This filter would not be necessary if the particles of the particle mixture of the disperse phase, which were introduced into the production process from the outside, e.g. from a supplier for dye pigments, for the first time in method step A, did not exceed this specific maximum particle size. In addition, in particular, the filter protects the separating device from oversize particles which have penetrated the process by error or otherwise.

At least one further particle filter ensures that the fine particles of the fine fraction dispersion with a particle size exceeding the threshold value for the particle size are not introduced into the storage tank. At least one such particle filter is advantageously arranged in the course of the fine particle line into the storage tank in order to guarantee a pure fine particle dispersion in the storage tank.

The threshold value for the particle size lies at the minimum between the two maxima of the bimodal size distribution. The bimodal size distribution is determined by the size of the particles in the particle mixture of the disperse phase, and by the type and manner of comminution or crushing of the coarse particles of the coarse fraction dispersion in the disperser.

The particle mixture of the disperse phase introduced in the predispersion process may in particular be obtained in powder form from external suppliers who usually produce this by crushing in conventional agitator ball mills.

It has been found from experience that, after the first performance of method step A, an asymmetrical bimodal size distribution occurs in which the maximum for fine particles lies at a higher level than the maximum for coarse particles, i.e. the proportion of the fine fraction dispersion is already greater than that of the coarse fraction dispersion.

The limit value for the separating method (step C) is the threshold value for the particle size. Particles with an equivalent diameter below the threshold value are separated out of the mixed dispersion into the fine fraction dispersion, and the larger particles into the coarse fraction dispersion.

Since classification does not take place with sufficient accuracy in the separating device, filtration of the fine particle dispersion (as described above) is necessary.

According to the ranges established above for the particle sizes of the fine and coarse particles, the method according to the invention is particularly suitable for threshold values from 0.01 to 1000 μm.

To achieve a regular circulation flow of dispersions in the production plant, the circulation flow is maintained with at least one pump. Advantageously, at least one pump is arranged in the course of the supply line into the separating device. By positioning the plant components of mixing tank, separating device, disperser and storage tank at different height levels, due to the effect of gravity on the dispersions amplified by the propulsion forces of the separating device and disperser, it would also be possible to maintain the production process without pumps. However, the pressure in the dispersion lines is increased by the use of pumps, and hence the controllability of the entire process improved. Thus the flow speeds of the dispersions can be controlled by the interaction of pump pressure and choke valves.

For the further configuration of the invention, by means of a control device, plant components such as the at least one metering pump, the at least one pump, the respective at least one particle filter, the at least one separating device, the at least one disperser, the at least one drive motor and the valves, can be controlled and the flow speeds of the dispersions can be changed according to the fill levels in the at least one mixing tank and in the at least one storage tank. By the use of a PLC control system, all controllable plant components can be set to the required production program.

The plant components are not restricted to those mentioned above, so further components may also be used and activated such as measuring instruments e.g. rheometer, and devices for particle size analysis by laser refraction, and for real-time measurement of colorimetric properties.

Further details, features and advantages of the subject of the invention arise from the description below of the attached figures, which show preferred exemplary embodiments of the invention. The features shown in the description and the drawings may be applied individually or in arbitrary combinations according to the invention.

The invention is described in more detail with reference to exemplary embodiments shown in the drawings.

BRIEF DESCRIPTION OF THE DRAWING

The drawings show.

DESCRIPTION OF THE PREFERRED EMBODIMENTS

Figure 1:
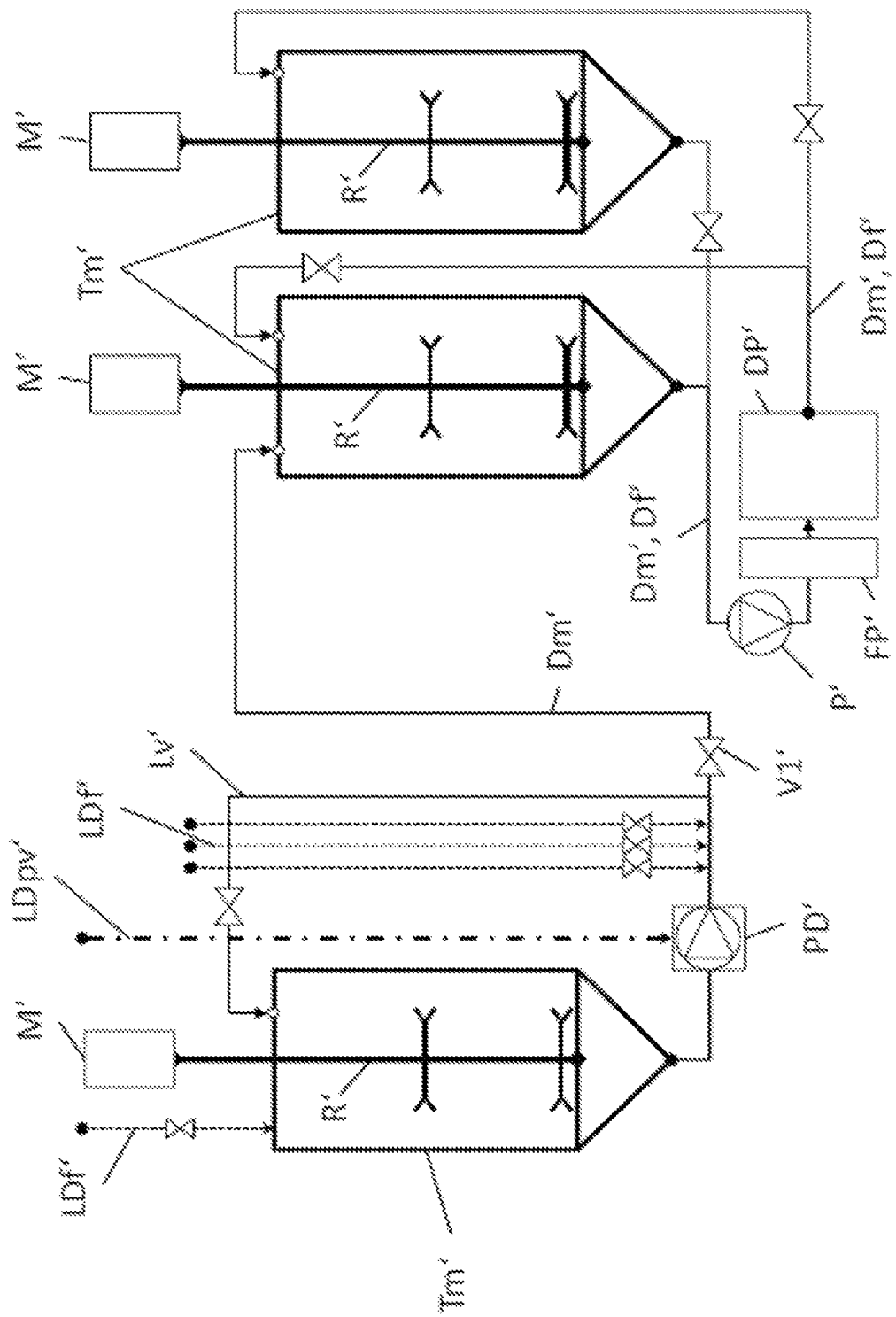
FIG. 1 a block circuit diagram of a production process for disperse dyes according to the prior art, and
FIG. 2 a block circuit diagram of a method according to the invention for continuous separation of a mixed dispersion into a coarse fraction dispersion and a fine fraction dispersion, in particular for the production of disperse dyes.

In the known production method according to FIG. 1, in particular dye pigments in powder form, e.g. purchased from a supplier of dye pigments, together with solvent, are introduced into a predispersion circulation process. The dye pigments (disperse phase) are introduced into the predispersion process by way of a metering line for powder under vacuum LDpv'. This vacuum metering line LDpv' introduces the dye pigment powder into a metering pump PD' in which the powder is mixed with the solvent (continuous phase). The dye pigments of the disperse phase may also be introduced into the predispersion process in other ways, such as directly into a mixing tank Tm'. The solvent of the continuous phase is introduced into the predispersion process by way of metering lines for liquid components LDf', e.g. in a predispersion line Lv' or in the mixing tank Tm'.

In the predispersion circulation process, the dye pigments are mixed with the solvent into a mixed dispersion Dm'. As long as a valve V1' is closed, the mixed dispersion Dm' circulates through the predispersion line Lv', the mixing tank Tm' and the metering pump PD', the pump pressure of which maintains the circulation. For mixing the mixed dispersion Dm', the mixing tank Tm' is provided with an agitator R' driven by a drive motor M'.

The circulation may be stopped by switching off the metering pump PD' so that the mixed dispersion Dm' is stored in the mixing tank Tm' and mixed further if required with the agitator R'. For discontinuous operation of the predispersion, it is advantageous if the mixing tank Tm', in which the mixed dispersion Dm' is temporarily stored for further processing, has a sufficiently large storage volume.

When the valve V1' is opened, the mixed dispersion Dm' enters a batch dispersion process according to the prior art. The dye pigments contained in the mixed dispersion Dm' are crushed in a disperser DP', which for example functions as an agitator ball mill.

By using two mixing tanks Tm', the batch dispersion process can be operated continuously. Even when a batch has been produced in one of the mixing tanks Tm' and is to be discharged from the mixing tank Tm' into a storage tank (not shown), the agitator ball mill DP' can continue to run since the next batch is being produced in the second mixing tank Tm'. The two mixing tanks Tm' may also be configured as shuttle tanks.

A pump P' and a particle filter FP' are connected upstream of the agitator ball mill DP'. The pump P' generates the pump pressure for conveying the mixed dispersion Dm' through the particle filter FP' and the agitator ball mill DP' into one of the mixing tanks Tm'.

After the crushing process in the agitator ball mill DP', the dye pigments do not have a uniform particle size. After a first passage of the dye pigments and solvents through the agitator ball mill DP', the dye dispersion or mixed dispersion Dm' has, from experience, an asymmetrically bimodal particle size distribution, in which the maximum for fine particles lies at a higher level than the maximum for coarse particles. To achieve a phase shift even more strongly in the direction of the fine fraction, the process operated in the batch method must be repeated several times. Thus a complete batch is passed through the agitator ball mill DP' several times, although an increasing fine fraction in the batch is already adequately comminuted and dispersed. When, after repeated passage through the process, a phase shift has been achieved to make the particle size distribution as monomodal as possible, in which the size distribution has only one maximum of fine particles, the mixing tank Tm' with the finished batch is exchanged for the second mixing tank Tm' in order to produce a new batch therein.

The resulting fine fraction dispersion Df located in the mixing tank Tm', which has been removed from the process circuit, can now be discharged into a storage tank. During this process, a new batch of dye or mixed dispersion Dm' is processed in the mixing tank Tm', newly introduced into the process circuit, until again the almost pure fine fraction dispersion Df has been produced. Before the fine fraction dispersion Df is discharged from the respective mixing tank Tm' into a storage tank, it passes through a particle filter (not shown).

Figure 2:
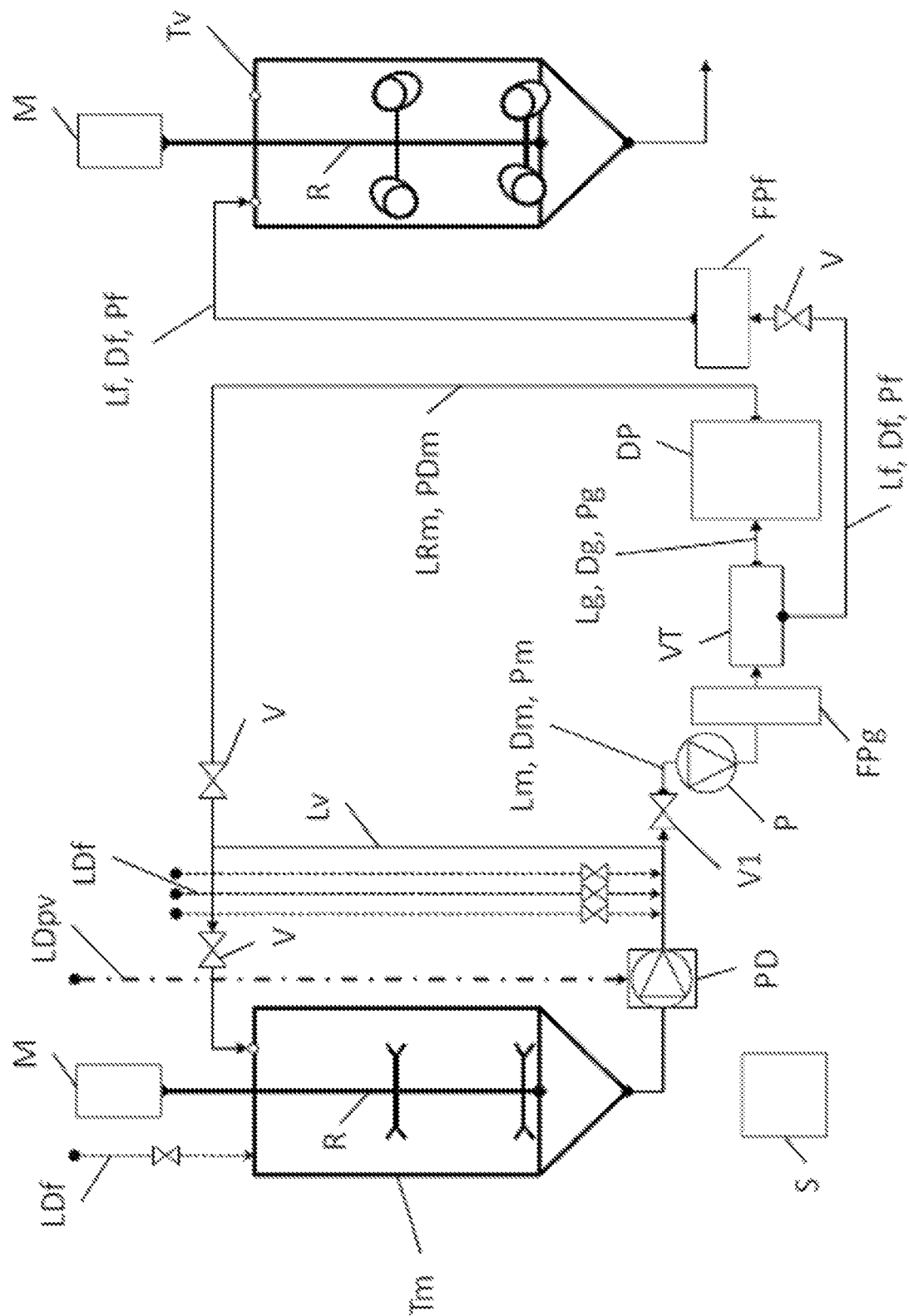

The predispersion process of the production method according to the invention, as shown in FIG. 2, differs from that of the prior art, shown in FIG. 1, in that a dispersed particle mixture PDm is returned from the main dispersion process to the predispersion process.

The main dispersion process of the production method according to FIG. 2 differs from the prior art, shown in FIG. 1, in particular in that, according to the invention, a continuously working separating device VT is connected upstream of a disperser DP.

Dye pigments are introduced by way of a metering line for powder LDpv. Solvent is introduced by way of metering lines for liquid components LDf. When the valve V1 is opened, a mixed dispersion Dm—which contains, in addition to a particle mixture Pm, the dispersed particle mixture PDm recirculated from the main dispersion process—is conducted not directly to the disperser DP, as shown in FIG. 1, but into the separating device VT. This takes place by way of a supply line Lm which contains a pump P and a particle filter FPg.

In the separating device VT, the particle mixture Pm (which also contains particles from the dispersed particle mixture PDm) contained in the mixed dispersion Dm is separated into coarse particles Pg of a coarse fraction dispersion Dg and into fine particles Pf of a fine particle dispersion Df. The separating device VT is configured such that only fine particles Pf which do not exceed a threshold value for the particle size desired by the customer, are separated into the fine fraction dispersion Df.

Since the separating device VT cannot guarantee with certainty observation of such a limit value for equivalent diameter of particles, the fine fraction dispersion Df must be filtered. A particle filter FPf is arranged in a fine fraction line Lf after the outlet from the separating device VT, so that the fine fraction dispersion Df, which flows through the fine fraction line Lf and the particle filter FPf into the storage tank Tv, meets the customer's quality requirements with regard to particle sizes.

The fine fraction dispersion Df here is the dispersion from which the end product or disperse dye is produced for the customer.

Also, before the mixed dispersion Dm is introduced into the separating device VT through the particle filter FPg, all particles of the particle mixture Pm (which also contains particles from the dispersed particle mixture PDm) contained in the mixed dispersion Dm and exceeding a specific maximum particle size, are filtered out.

The pump P maintains the flow of dispersions Dm, Dg, Df, PDm in the main dispersion process. The pump P generates sufficient delivery pressure to conduct the mixed dispersion Dm through the supply line Lm and the particle filter FPg into the separating device VT, and also to conduct the coarse fraction dispersion Dg and fine fraction dispersion Df—separated from the mixed dispersion Dm in the separating device VT—respectively through a coarse fraction line Lg into the disperser DP and through the fine fraction line Lf and the particle filter FPf into the storage tank Tv.

The coarse particles Pg of the coarse fraction dispersion Dg are crushed in the disperser DP. This creates the dispersed particle mixture PDm, which is conducted by the delivery pressure in the return line LRm back into the predispersion process, in order to be mixed in the mixing tank Tm with the mixed dispersion Dm produced in method step A from the disperse and continuous phase.

By changing the delivery pressure by way of the running speed of the pump P and/or the choke valves, such as valve V1, the flow speeds of the dispersions Dm, Dg, Df, PDm can be regulated.

As well as the valves V, V1 shown in the figure, further shut-off and regulation devices may be arranged in the entire production plant.

Both the mixing tank Tm and the storage tank Tv have an agitator R driven by a drive motor M, wherein the agitators R are advantageously configured differently according to the active mixing function in the mixing tank Tm and the maintenance function of the mixture in the storage tank Tv.

In the production method according to the invention, several of the respective plant components such as the pumps PD, P, particle filters FPg, FPf, separating device VT, disperser DP, mixing tank Tm, storage tank Tv, agitator R, drive motor M, lines Lv, Lm, Lf, Lg, LRm, and valves V, V1, may be connected in parallel with each other and work simultaneously or alternately. This allows, amongst others, a higher throughput and cleaning or maintenance of the respective further second or third components even during operation of the plant.

By means of a control device S, there is a possibility of matching plant components such as PD, P, FPg, FPf, VT, DP, M, V, V1 to each other and regulating the flow speeds of the dispersions Dm, Dg, Df, PDm according to the fill levels in the mixing tank Tm and storage tank Tv. Not all plant components listed above need be actuated. However, further plant components (not listed here) may be incorporated in the control device for the production plant, wherein said control device is for example a programmable logic controller.

LIST OF REFERENCE SIGNS

LDpv', LDpv Metering line for powder under vacuum
PD', PD Metering pump
TM', Tm Mixing tank
LDf', LDf Metering lines for liquid components
Lv', Lv Predispersion line
DM', Dm Mixed dispersion
V1', V1, V Valves
R', R Agitator
M', M Drive motor
DP', DP Disperser
P', P Pump
FP', FPg, FPf Particle filter
Df, Df Fine fraction dispersion
PDm Dispersed particle mixture
VT Separating device
Pm Particle mixture
Lm Supply line
Pg Coarse particle
Dg Coarse fraction dispersion
Pf Fine particle
Lf Fine fraction line
Tv Storage tank Lg Coarse fraction line
LRm Return line
S Control device

The invention claimed is:

1. Method for producing dispersions of a defined particle size, wherein a mixed dispersion is continuously separated into a coarse fraction dispersion and a fine fraction dispersion, comprising the following steps:
- A) continuously or discontinuously producing the mixed dispersion in a predispersion process, in that a particle mixture of a disperse phase is mixed with a liquid continuous phase to form the mixed dispersion and is temporarily stored in at least one mixing tank,
- B) introducing the mixed dispersion from the predispersion process into at least one continuously operating separating device,
- C) separating the particle mixture of the mixed dispersion in the at least one separating device into coarse particles (Pg) of the coarse fraction dispersion and into fine particles (Pf) of the fine fraction dispersion according to a threshold value for the particle size,
- D) discharging the fine fraction dispersion from the at least one separating device into at least one storage tank,
- E) discharging the coarse fraction dispersion from the at least one separating device into at least one disperser,
- F) crushing the coarse particles (Pg) of the coarse fraction dispersion in the at least one disperser into a dispersed particle mixture (PDm), and returning the dispersed particle mixture (PDm) into the at least one mixing tank in the predispersion process, and
- G) mixing the dispersed particle mixture (PDm) returned to the predispersion process with the mixed dispersion produced in the predispersion process in the at least one mixing tank.

2. Method according to claim 1, characterised in that the method steps A to G are repeated until the mixed dispersion in at least one mixing tank or the fine fraction dispersion in at least one storage tank has exceeded a specific fill level.

3. Method according to claim 2, characterised in that the method step A for producing the mixed dispersion is intensified on continuous production and repeated more often on discontinuous production as soon as the mixed dispersion in at least one mixing tank has fallen below a specific minimum fill level.

4. Method according to claim 1, characterised in that the mixed dispersion to be separated is a dye dispersion with fractions of coarse and fine dye pigments.

5. Method according to claim 1, characterised in that the particle size of the coarse particles lies in the range from 0.5 µm to 1000 µm, and the particle size of the fine particles lies in the range from 0.01 µm to 100 µm.

6. Method according to claim 1, characterised in that at least one particle filter ensures that the particles of the particle mixture of the mixed dispersion produced in the predispersion process and exceeding a specific maximum particle size are not introduced into the separating device.

7. Method according to claim 1, characterised in that at least one particle filter ensures that the fine particles of the fine fraction dispersion which have a particle size exceeding the threshold value for the particle size are not introduced into the storage tank.

8. Method according to claim 1, characterised in that a circulation flow of dispersions is maintained with at least one pump.

9. Method according to claim 8, characterised in that by means of a control device, the at least one pump and at least one valve can be controlled and the flow speeds of the dispersions can be changed according to the fill levels in the at least one mixing tank and in the at least one storage tank.

* * * * *